US012789661B2

(12) United States Patent
Wang

(10) Patent No.: US 12,789,661 B2
(45) Date of Patent: Nov. 10, 2026

(54) ELECTRIC VEHICLE CHARGING CONTROL APPARATUS AND METHOD

(71) Applicant: Changchun Jetty Automotive Technology Co., Ltd., Changchun (CN)

(72) Inventor: Chao Wang, Changchun (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 763 days.

(21) Appl. No.: 18/034,335

(22) PCT Filed: Jun. 25, 2021

(86) PCT No.: PCT/CN2021/102340

§ 371 (c)(1),
(2) Date: Apr. 27, 2023

(87) PCT Pub. No.: WO2022/095472

PCT Pub. Date: May 12, 2022

(65) Prior Publication Data

US 2024/0336157 A1 Oct. 10, 2024

(30) Foreign Application Priority Data

Nov. 6, 2020 (CN) ......................... 202011233775.5

(51) Int. Cl.
*B60L 53/62* (2019.01)
*B60L 53/16* (2019.01)
*B60L 53/18* (2019.01)

(52) U.S. Cl.
CPC ............... *B60L 53/62* (2019.02); *B60L 53/16* (2019.02); *B60L 53/18* (2019.02); *B60L 2240/36* (2013.01)

(58) Field of Classification Search
CPC ....................................................... B60L 53/18
See application file for complete search history.

(56) References Cited

U.S. PATENT DOCUMENTS

2002/0034166 A1 3/2002 Barany et al.
2012/0212179 A1 8/2012 Nathan et al.
(Continued)

FOREIGN PATENT DOCUMENTS

CN 102651526 A 8/2012
CN 10547034 A 4/2016
(Continued)

OTHER PUBLICATIONS

Japanese Patent Office, "Notice of Reasons for Refusal," issued in connection with Japanese Patent Application No. 2023-527085, dated Jul. 16, 2024, 6 pages. [English translation provided].
(Continued)

*Primary Examiner* — Daniel Kessie
(74) *Attorney, Agent, or Firm* — Hanley, Flight & Zimmerman, LLC

(57) ABSTRACT

An electric vehicle charging control apparatus and method related to a technical field of electric vehicle charging. The method includes: obtaining a first working temperature of an interior of a power connector and a second working temperature of an interior of a charging control box during charging the electric vehicle with a charging power equal to the first charging power; and controlling the charging power output to the electric vehicle according to the working temperature of the interior of the power connector obtained by the power connector temperature detection unit. By the embodiments of the present disclosure, the charging efficiency can be improved and the charging time can be shortened on the premise of ensuring the charging safety of the electric vehicle.

17 Claims, 8 Drawing Sheets

(56) References Cited

U.S. PATENT DOCUMENTS

| | | | | |
|---|---|---|---|---|
| 2013/0335024 | A1* | 12/2013 | Akai | B60L 3/0069 320/109 |
| 2015/0028809 | A1* | 1/2015 | Nishikawa | B60L 53/66 320/109 |
| 2015/0039482 | A1 | 2/2015 | Fujinaga | |
| 2016/0059731 | A1 | 3/2016 | Jung et al. | |
| 2016/0339786 | A1 | 11/2016 | Dickinson et al. | |
| 2018/0034291 | A1 | 2/2018 | Wang et al. | |
| 2020/0177010 | A1 | 6/2020 | Tamoto | |
| 2020/0282851 | A1 | 9/2020 | Sasaridis et al. | |
| 2024/0336157 | A1 | 10/2024 | Wang | |

FOREIGN PATENT DOCUMENTS

| | | | |
|---|---|---|---|
| CN | 107015049 | A | 8/2017 |
| CN | 109936185 | A | 6/2019 |
| CN | 110481358 | A | 11/2019 |
| CN | 209880993 | U | 12/2019 |
| CN | 110673667 | A | 1/2020 |
| CN | 210191184 | U | 3/2020 |
| CN | 110949156 | A | 4/2020 |
| CN | 211000963 | U | 7/2020 |
| CN | 112248866 | A | 1/2021 |
| CN | 213705226 | U | 7/2021 |
| CN | 112248866 | B | 4/2022 |
| EP | 2502778 | A2 | 9/2012 |
| EP | 4242051 | A1 | 9/2023 |
| JP | 2008027826 | A | 2/2008 |
| JP | 2009003663 | A | 1/2009 |
| JP | 2012196120 | A | 10/2012 |
| JP | 2013198372 | A | 9/2013 |
| JP | 2015032911 | A | 2/2015 |
| JP | 2016052244 | A | 4/2016 |
| JP | 2019003872 | A | 1/2019 |
| JP | 2020092485 | A | 6/2020 |
| WO | 2013132874 | A1 | 9/2013 |
| WO | 2015015530 | A1 | 2/2015 |
| WO | 2022095472 | A1 | 5/2022 |

OTHER PUBLICATIONS

Korean Patent Office, "First Office Action," issued in connection with Korean Patent Application No. 10-2023-7012674, dated Jul. 8, 2024, 24 pages. [English translation provided].

Canadian Intellectual Property Office, "First Office Action," issued in connection with Canadian Patent Application No. 3,196,680, dated Sep. 19, 2024, 8 pages.

Japanese Patent Office, "Notice of Reasons for Refusal," issued in connection with Japanese Patent Application No. 2023-527085, dated Apr. 1, 2024, 23 pages. [English translation included].

European Patent Office, "Extended European Search Report," issued in connection with European Patent Application No. 21888175.3, dated Apr. 5, 2024, 4 pages.

Mexican Patent Office, "First Office Action," issued in connection with Mexican Patent Application No. MX/a/2023/005158, dated May 18, 2023, 8 pages.

International Searching Authority, "Written Opinion," issued in connection with International Patent Application No. PCT/CN2021/102340, issued Sep. 26, 2021, 9 pages. [English translation included].

International Bureau, "International Preliminary Report on Patentability," issued in connection with International Patent Application No. PCT/CN2021/102340, issued May 8, 2023, 11 pages. [English translation included].

The State Intellectual Property Office of People's Republic of China, "Notification to Grant," issued in connection with Chinese Patent Application No. 202011233775.5, issued Apr. 1, 2022, 3 pages. [English translation included].

International Searching Authority, "International Search Report," in connection with International Patent Application No. PCT/CN2021/102340, issued Sep. 26, 2021, 3 pages.

China National Intellectual Property Administration, "Search Report," in connection with Chinese Patent Application No. 202011233775.5, issued Nov. 9, 2021, 4 pages. English translation provided.

China National Intellectual Property Administration, "First Notification of Office Action" in connection with Chinese Patent Application No. 202011233775.5, issued Nov. 9, 2021, 8 pages. English translation provided.

Vietnamese Patent Office, "Office Action", issued on Mar. 31, 2025 for counterpart Vietnamese Patent Application No. 1-2023-03281, 2 pages (English Translation Included).

Brazilian Patent Office, "Office Action and Search Report" issued on May 20, 2025 for counterpart Brazilian Patent Application No. BR1120230080070, 8 pages (English Translation Included).

European Patent Office, "Communication Pursuant to Article 94(3) EPC," in connection with European Patent Application No. 21888175.3, dated Jul. 23, 2025, 11 pages.

Thailand Patent Office, "First Office Action," issued in connection with Thailand Patent application No. 2301002656, issued on Aug. 9, 2025, 7 pages. [with English Translation].

Canadian Intellectual Property Office, "Second Office Action and Search Report," issued in connection with Canadian Patent Application No. 3,196,680, dated Aug. 20, 2025, 4 pages.

Intellectual Property India, "Hearing Notice," issued in connection with IN Patent Application No. 202327038178, dated Oct. 9, 2025, 2 pages.

European Patent Office, "Communication Pursuant to Article 94(3) EPC", issued in connection with EP Patent Application No. 21 888 175.3 on Jan. 20, 2025, 8 pages.

Intellectual Property India, "Examination Report", issued in connection with IN Patent Application No. 202327038178 on Feb. 18, 2025, 6 pages.

Japan Patent Office, "Decision of Refusal", issued in connection with JP Patent Application No. 2023-527085 on Jan. 21, 2025, 12 pages (English Translation included).

Korean Patent Office, "Office Action", issued in connection with KR Patent Application No. 10-2023-7012674 on Mar. 11, 2025, 8 pages (English Translation included).

Mexican Patent Office, "Second Office Action," issued in connection with Mexican Patent Application No. MX/a/2023/005158, dated Nov. 7, 2025, 12 pages. [with English Translation].

* cited by examiner

ELECTRIC VEHICLE CHARGING CONTROL APPARATUS AND METHOD

CROSS REFERENCE TO RELATED APPLICATION

The present disclosure is a US National Stage of International Application No. PCT/CN2021/102340, filed Jun. 25, 2021, which claims priority to Chinese Patent Application No. 202011233775.5, filed on Nov. 6, 2020, entitled 'electric vehicle charging control apparatus and method' which are hereby incorporated by reference in their entireties.

TECHNICAL FIELD

The present disclosure relates to a technical field of electric vehicle charging, and particularly to an electric vehicle charging control apparatus and method.

BACKGROUND

In recent years, the electric vehicles have been developed rapidly all over the world, and the numbers of the electric vehicles and the charging piles rise continuously. The users hope to charge the vehicle battery as soon as possible. In the prior art, high-power modes such as large current and high voltage are usually adopted to meet the users' needs for charging the vehicle battery. However, the temperature of the vehicle battery increases with time during charging, and continually charging the vehicle battery in the high-power mode may lead to various charging safety accidents, so the charging safety and reliability have become a very important problem urgently to be solved.

In the prior art, most of the charging piles will continue to charge the vehicle battery by reducing the charging power after the working temperature increases. However, this way simply reduces the output charging power, which will lead to a great difference between the actual output power of the charging pile and the required power of the vehicle. This situation undoubtedly prolongs the charging time of the vehicle battery, and also increases the uncontrollability and the charging risk during the charging process of the vehicle battery.

How to reduce the extension of the charging time caused by the increase of temperature during the charging of the vehicle battery while ensuring the safety is a problem urgently to be solved in the prior art.

SUMMARY

In order to solve the technical problem in the prior art, the embodiments of the present disclosure provide an electric vehicle charging control apparatus and method, which solve the problem in the prior art that the charging speed is slow and the charging efficiency is low due to the temperature change.

The present disclosure provides an electric vehicle charging control method, including:

- obtaining a first working temperature of an interior of a power connector and a second working temperature of an interior of a charging control box during charging the electric vehicle with a charging power equal to the first charging power;
- reducing the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold; and
- charging the electric vehicle with the charging power lower than or equal to the first charging power, when the first working temperature decreases to be less than or equal to the first temperature threshold.

The present disclosure further provides an electric vehicle charging control apparatus, including:

- a power connector temperature detection unit provided in a power connector and configured to obtain a first working temperature of an interior of the power connector and a second working temperature of an interior of a charging control box during charging the electric vehicle with a charging power equal to the first charging power; and
- a charging control unit configured to:
  - reduce the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold, and
  - charge the electric vehicle with the charging power lower than or equal to the first charging power, when the first working temperature decreases to be less than or equal to the first temperature threshold.

The embodiments of the present disclosure further provide a computer device, comprising a memory, a processor and a computer program stored in the memory and executable on the processor, wherein the processor is configured to execute the computer program to implement the aforementioned method.

The embodiments of the present disclosure further provide a computer nonvolatile readable storage medium storing a computer instruction, wherein when being executed by a processor, the computer instruction implements the aforementioned method.

By using the embodiments of the present disclosure, the charging efficiency can be improved and the charging time can be shortened on the premise of ensuring the charging safety of the electric vehicle. By disposing the power connector temperature detection unit at the power connector, the reaction speed of the temperature detection can be improved and the cost of the wire cables can be reduced. By regulating the charging power according to the working temperature of the printed circuit board in the charging control box in conjunction with the working temperature of the power connector, the charging safety of the electric vehicle can be further improved. Of course, the implementation of any of the products and/or methods of the present disclosure does not need to achieve all of the advantages mentioned above.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

REFERENCE SIGNS

100: electric vehicle; 101: vehicle connector; 102: charging control box; 103: charging control unit; 104: power connector temperature detection unit; 105: power connector; 106: charging power supply; 201: power connector temperature detection unit; 202: charging control unit; 203: memory; 204: prompting unit; 205: communication unit; 206: filter; 207: PCB temperature detection unit; 501: temperature detection unit; 502: comparison unit; 503: charging control unit; 504: driving unit; 505: switch unit; 506: compensation unit; 600: charging control apparatus; 601: temperature detection unit; 602: comparison unit; 603: charging control unit; 604: driving unit; 605: switch unit; 606: compensation unit; 607: power regulation unit; 608: feedback unit; 701: live wire terminal; 702: temperature detection unit; 703: signal transmission line; 704: ground wire; 705: charging cable; R1, R2, R3, R4, R5, R6, R7, R8: resistor; RT1: thermistor; U1: operational amplifier; D1, D2: diode; Q1, Q2, Q3: triode; K1: switch; VCC: power supply; $V_{REF}$: reference voltage; $V_i$: temperature voltage; $V_{out}$: output end; Y1, Y2: triode; C1, C2: capacitor; FBI: resistor.

DETAILED DESCRIPTION

A clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Figure 1A:
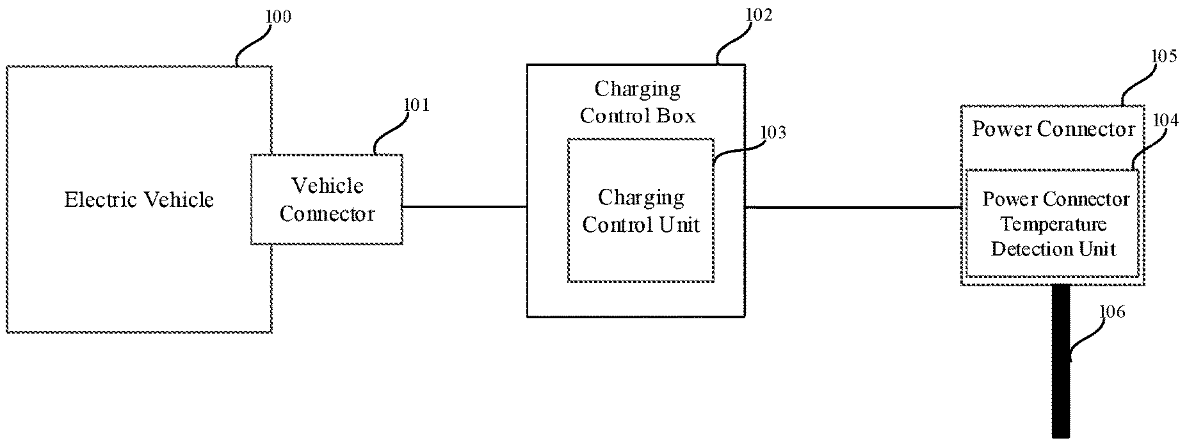
FIGS. 1*a* to 1*c* illustrate schematic structural diagrams of a charging control system of an electric vehicle according to an embodiment of the present disclosure.
Figure 1B:
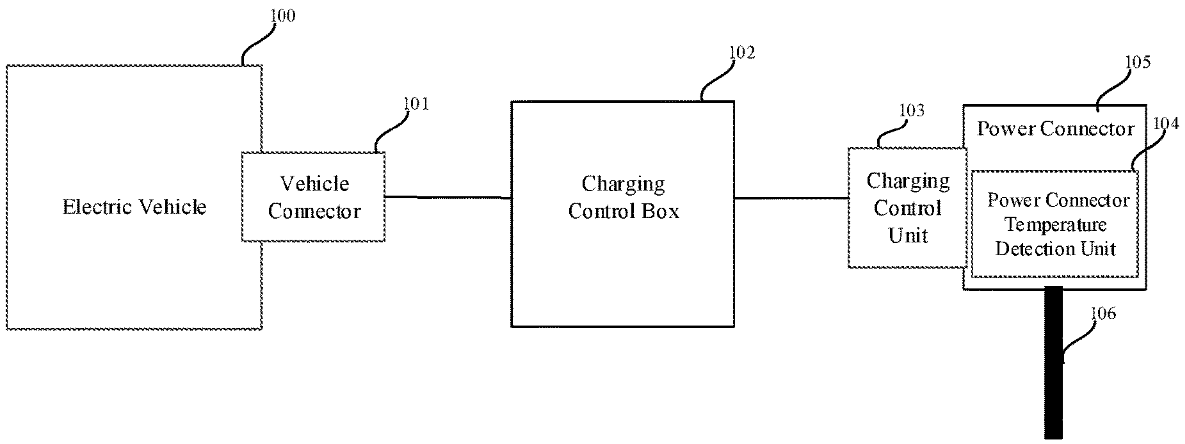
Figure 1C:
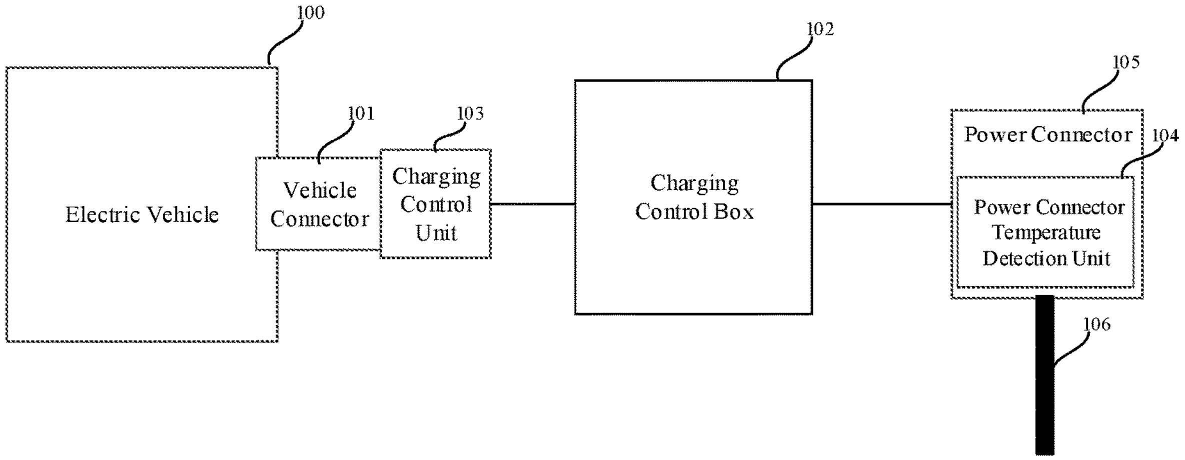

FIGS. 1*a* to 1*c* illustrate schematic structural diagrams of an electric vehicle charging control system according to an embodiment of the present disclosure. An electric vehicle 100 is connected to a charging power supply 106 through a vehicle connector 101, a charging control box 102, a charging control unit 103, a power connector temperature detection unit 104 and a power connector 105. The charging power supply 106 is configured to output charging current required for charging the electric vehicle 100 to the electric vehicle 100 through the power connector 105. The charging current is transmitted to the electric vehicle 100 through the power connector 105, the charging control box 102 and the vehicle connector 101, and the power connector temperature detection unit 104 is located in the power connector 105. The charging control unit 103 is configured to control the output power of the charging current according to a working temperature collected by the power connector temperature detection unit 104, so that a high-speed charging of the electric vehicle 100 can be maintained when the working temperature increases, thereby shortening the charging time and improving the charging efficiency. The power connector temperature detection unit 104 may be integrated into the power connector 105, so that a change of the working temperature in the charging process of the electric vehicle can be obtained more quickly. The working temperature refers to a temperature of a charging component other than the battery in the electric vehicle, such as a temperature of a terminal of the power connector 105, a temperature of an electric cable, and a temperature of a component in the charging control box 102. Since the power connector temperature detection unit 104 is located in the power connector 105, the detected working temperature is a temperature in the power connector 105.

The charging control unit 103 may be disposed in the charging control box 102 as illustrated in FIG. 1*a*, wherein the charging control box 102 between the vehicle connector 101 and the power connector 105 includes components such as a transformer and a charging protection unit, and in some embodiments, it may be a charging pile or a portable in-cable charging control box. Alternatively, the charging control unit 103 may be located in the power connector 105 as shown in FIG. 1*b*. Alternatively, the charging control unit 103 may be located in the vehicle connector 101 as shown in FIG. 1*c*. The power connector temperature detection unit 104 is built in the power connector 105, and may be a thermistor or the like to collect a temperature of an electrode in the power connector 105. The charging control unit 103 is configured to control the power of the charging current output to the electric vehicle 100 (including regulating the charging current or voltage), so as to reduce the temperature in the power connector 105 by reducing the output charging power.

Figure 2:
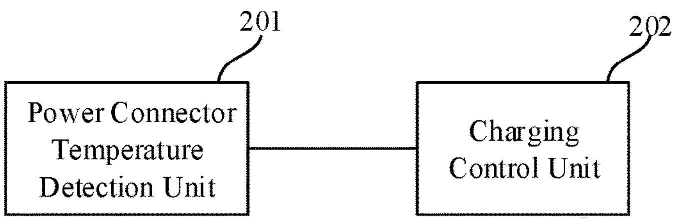
FIG. 2 illustrates a schematic structural diagram of an electric vehicle charging control apparatus according to an embodiment of the present disclosure.

FIG. 2 illustrates a schematic structural diagram of an electric vehicle charging control apparatus according to an embodiment of the present disclosure. FIG. 2 depicts a structure of an apparatus capable of changing a charging power more quickly according to a temperature change caused by charging in a charging process of an electric vehicle, and a temperature increase caused by charging the electric vehicle with high power can be reduced by the apparatus. The apparatus may be implemented by a dedicated chip or a general chip, or executable on a single chip microcomputer or an industrial computer, wherein functional modules thereof may be implemented by software or logic circuits. The apparatus specifically includes:

a power connector temperature detection unit 201 located in a power connector and configured to obtain a first working temperature of an interior of the power connector and a second working temperature of an interior of a charging control box during charging the electric vehicle with a charging power equal to the first charging power;

a charging control unit 202 connected to the power connector temperature detection unit and configured to:

reduce the charging power output to the electric vehicle form the first charging power to a second charging power, when the first working temperature is greater than or equal to a first temperature threshold and less than a second temperature threshold, and the second working temperature is greater than or equal to a fourth temperature threshold and less than a fifth temperature threshold; and charge the electric vehicle with the charging power lower than or equal to the first charging power, when the first working temperature decreases to be less than or equal to the first temperature threshold.

The electric vehicle is stopped from being charged when the first working temperature is continuously greater than or equal to the first temperature threshold within a predetermined time interval.

In the process of charging the electric vehicle with the charging power lower than or equal to the first charging power, when the first working temperature decreases to be less than or equal to the first temperature threshold, the charging power lower than or equal to the first charging power may be the second charging power, or a power lower than the first charging power, such as being lower than the second charging power or between the first charging power and the second charging power.

Figure 3:
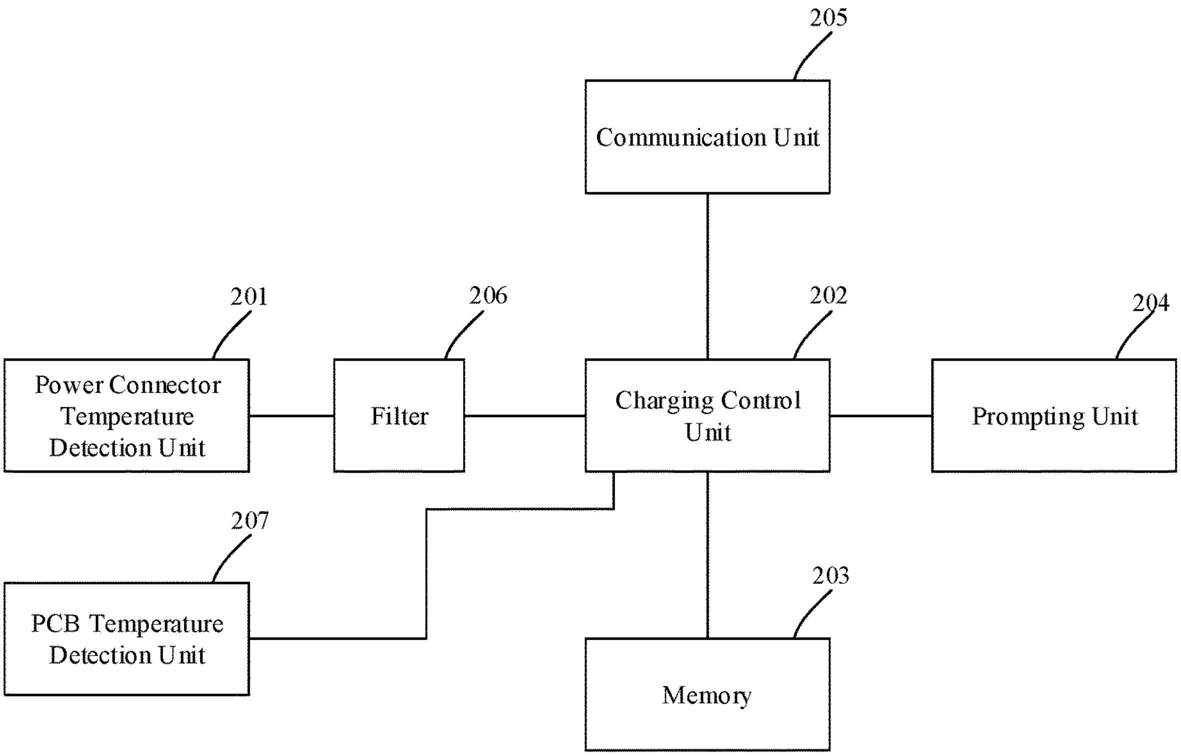
FIG. 3 illustrates a specific structural diagram of an electric vehicle charging control apparatus according to an embodiment of the present disclosure.

FIG. 3 illustrates a specific structural diagram of an electric vehicle charging control apparatus according to an embodiment of the present disclosure, in which an internal logical structure of each functional unit is refined, and the charging control apparatus further includes:

a memory 203 configured to store time specified by a user;

wherein the power connector temperature detection unit 201 is configured to obtain a working temperature of the interior of the power connector according to the specified time.

In this embodiment, the memory 203 may be a non-volatile memory, for example including: a programmable read-only memory, an electrically erasable programmable read only memory, and a flash memory. The programmable read-only memory is internally provided with fuses in rows and columns which can be burned off by current according to the needs of users (manufacturers) to write the required data and program, and the fuses cannot be recovered once being burned off, i.e., the data cannot be changed anymore. The electrically erasable programmable read only memory may operate on a similar principle to that of an EPROM, but the erasing adopts a high electric field and no transparent window is required. The flash memory is a form of an electrically erasable programmable read-only memory, and is a memory allowed to be erased or written multiple times during operation. The flash memory is used for the general data storage, and the data exchange and transmission between a computer and any other digital product, such as a memory card or a USB flash disk.

In an embodiment of the present disclosure, the apparatus further includes a prompting unit 204 configured to prompt a user of a state of the current working temperature by means of sound or light.

In this step, prompting the user by means of sound or light includes realizing a sound or voice prompt by a device such as a buzzer or a speaker, and prompting the state of the current working temperature by displaying with a multicolor LED lamp or a plurality of monochromatic LED lamps. The user may also be prompted by means of vibration or display on a display screen, or prompt information may be transmitted to an intelligent terminal of the user (e.g., an intelligent device such as a mobile phone) by means of an APP (application software). The user may be prompted to notice whether a charging element of the electric vehicle is located near a heat source or in a case where the user can manually release the heat source. The state of the working temperature refers to a temperature range of the current working temperature. For example, it is a normal charging state when the current working temperature is between the first temperature threshold and the second temperature threshold; it is a dangerous charging state with a high temperature when the current working temperature is equal to or higher than the second temperature threshold; it is a normal charging state when the current working temperature is lower than the first temperature threshold; and it is a charging state in which the temperature exceeds a safety requirement when the current working temperature reaches the second temperature threshold.

In an embodiment of the present disclosure, the apparatus further includes a communication unit 205 configured to transmit prompt information prompting the user of the state of the current working temperature to an intelligent terminal of the user.

In this embodiment, the communication unit 205 is connected to the charging control unit 202. The charging control unit 202 is configured to convert the working temperature of the interior of the power connector obtained by the power connector temperature detection unit 201 into digital data, then determine the state of the current working temperature according to the working temperature, and transmit the state of the current working temperature to the communication unit 205 which wirelessly transmits the state of the current working temperature to the intelligent terminal of the user.

In an embodiment of the present disclosure, the power connector temperature detection unit 201 is located on a live wire terminal and/or a neutral wire terminal in the power connector, and the temperature detection unit 501 is fixed to the live wire terminal and/or the neutral wire terminal by insulative and heat-conductive silica gel.

In this embodiment, it is possible to quickly transmit the temperature of the live wire terminal or the neutral wire terminal in the power connector to the power connector temperature detection unit, and avoid the accident that the charging control unit is burned by the high-voltage charging current due to the thermistor used as the power connector temperature detection unit.

In an embodiment of the present disclosure, a plurality of power connector temperature detection units 201 may be disposed on the live wire terminal and/or the neutral wire terminal in the power connector, connected in series or parallel to collect the working temperature of the live wire terminal and/or the neutral wire terminal in the power connector, and transmit the working temperature to the charging control unit 202 through one signal transmission line and one ground wire.

In this embodiment, since the charging control unit 202 may be located on the power connector, or in the charging control box on an electric cable which transmits the charging current, or on the vehicle connector, and in each case is in a distance from the power connector temperature detection unit 201, so the working temperatures collected by the plurality of power connector temperature detection units 201 are transmitted to the charging control unit 202 in the form of weak voltage signals (e.g., between 0.3 V and 5 V). In order that the product is entirely integral, it is necessary to provide the signal transmission line and the ground wire which transmit the working temperature inside a charging cable between the power connector and the vehicle connector. However, the charging cable transmits strong current (e.g., 220 V to 380 V) for charging the electric vehicle, and the diameter and weight of the charging cable are already very large. Therefore, in order to save the cost of lines transmitting the working temperature and reduce the impact on the charging cable, when a plurality of power connector temperature detection units 201 are used to detect the temperature in the power connector, all of the power connector temperature detection units 201 are connected in series or in parallel, and when any of the power connector temperature detection units 201 detects a high-temperature signal, the detected highest working temperature is output, and only one signal transmission line and one ground wire are used to transmit the working temperature of the live wire terminal and/or the neutral wire terminal in the power connector.

In an embodiment of the present disclosure, the apparatus further includes a filter 206, which is connected to the power connector temperature detection unit 201 and configured to remove an interference signal in the working temperature collected by the power connector temperature detection unit 201.

In this embodiment, when the power connector temperature detection unit 201 is an element such as a thermistor to collect the temperature in the power connector, the output of a weak electric signal representing the working temperature may be interfered by a power frequency of the charging current of the power connector. Therefore, before the power connector temperature detection unit 201 transmits the working temperature to the charging control unit 202 through a working temperature signal transmission line, a power frequency interference signal is filtered out by the filter 206 in this embodiment.

In an embodiment of the present disclosure, the ground wire and the working temperature signal transmission line connected between the power connector temperature detection unit 201 and the charging control unit 202 are shielded wires.

In this embodiment, by using the shielded wires as the working temperature signal transmission line and the corresponding ground wire, it is possible to further reduce the interference of the charging current on the weak electric signal of the working temperature, so that the detected working temperature is more accurate, and the charging power can be controlled more accurately.

In an embodiment of the present disclosure, the apparatus further includes a PCB temperature detection unit 207 configured to detect the working temperature of the interior of the charging control box. The charging control unit 202 is connected to the PCB temperature detection unit and the power connector temperature detection unit, and configured to control the charging power output to the electric vehicle according to the working temperature of the interior of the charging control box obtained by the PCB temperature detection unit 207 and the working temperature of the interior of the power connector obtained by the power connector temperature detection unit 201.

In this embodiment, the structure of the PCB temperature detection unit 207 is the same as that of the power connector temperature detection unit 201 in the aforementioned embodiment, except that the PCB temperature detection unit 207 is located on a printed circuit board (PCB) in the charging control box, and collects the temperature of components located on the PCB in the charging control box as the working temperature. The PCB temperature detection unit 207 may be fixed on the printed circuit board in the charging control box by the aforementioned insulative and heat-conductive silica gel. The working temperature of the interior of the charging control box may be transmitted to the charging control unit 202 through another working temperature signal transmission line and the corresponding ground wire, wherein the working temperature signal transmission line and the corresponding ground wire may be composed of shielded wires.

In a further embodiment, the PCB temperature detection unit may be mounted on a relay in the charging control box and/or a connection terminal of a connector. The relay is a switch in the charging control box. The connector is a plug-in at a joint between an electric cable or a wire cable and the PCB board. The connection terminal is a terminal on the connector connected to the electric cable or the wire cable.

By adopting the apparatus of the embodiments of the present disclosure, the charging efficiency can be improved and the charging time can be shortened on the premise of ensuring the charging safety of the electric vehicle. By disposing the power connector temperature detection unit at the power connector, the reaction speed of the temperature detection can be improved and the cost of the wire cables can be reduced. By regulating the charging power according to the working temperature of the printed circuit board in the charging control box in conjunction with the working temperature of the power connector, the charging safety of the electric vehicle can be further improved.

Figure 4:
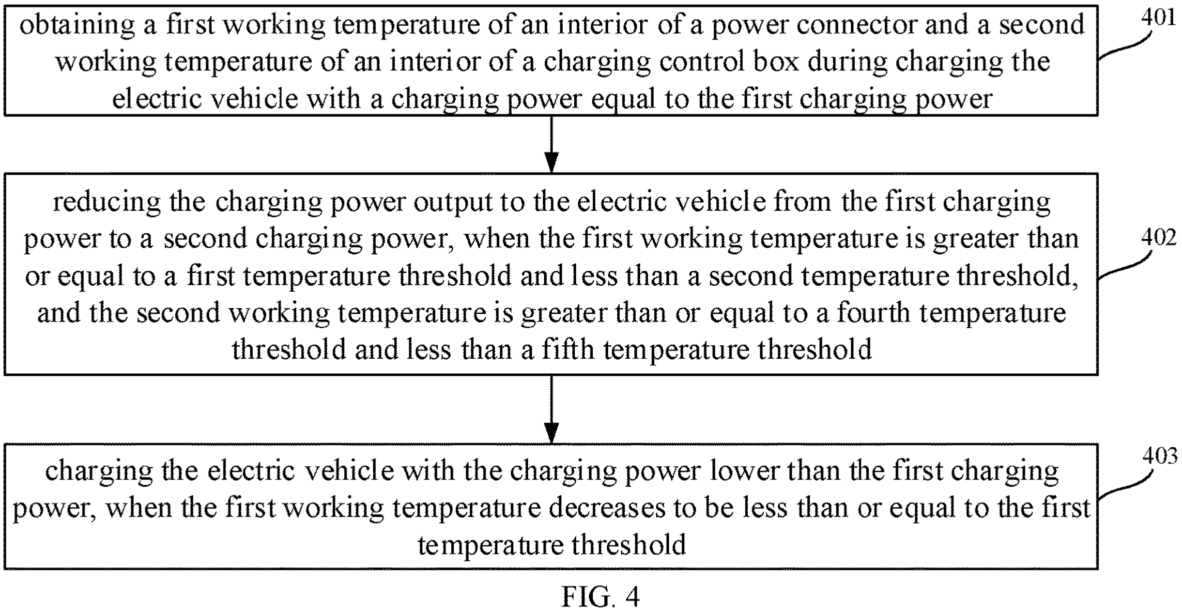
FIG. 4 illustrates a flowchart of an electric vehicle charging control method according to an embodiment of the present disclosure.

FIG. 4 illustrates a flowchart of an electric vehicle charging control method according to an embodiment of the present disclosure. FIG. 4 depicts a specific method for controlling charging power of an electric vehicle according to two factors, i.e., a working temperature of a power connector in conjunction with a working temperature of a charging control box, thereby avoiding the inaccuracy caused by controlling the charging power of the electric vehicle according to one single factor, and improving the charging safety of the electric vehicle. The method specifically includes:

step 401: obtaining a first working temperature of an interior of a power connector and a second working temperature of an interior of a charging control box during charging the electric vehicle with a charging power equal to the first charging power;

step 402: reducing the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold; and step 403: charging the electric vehicle with the charging power lower than or equal to the first charging power, when the first working temperature decreases to be less than or equal to the first temperature threshold.

The charging power lower than or equal to the first charging power may be any power value greater than 0, and for example, the charging power may be maintained at the second charging power to charge the electric vehicle.

In an embodiment of the present disclosure, the electric vehicle is stopped from being charged when the first working temperature is continuously greater than or equal to the first temperature threshold within a predetermined time interval.

In an embodiment of the present disclosure, the electric vehicle is stopped from being charged when the first working temperature is greater than or equal to the second temperature threshold; or the electric vehicle is stopped from being charged when the second working temperature is greater than or equal to the fifth temperature threshold.

In this step, for example, the first temperature threshold may be 75° C., the second temperature threshold may be 78° C., the fourth temperature threshold may be 110° C., and the fifth temperature threshold may be 113° C. All of the above temperature thresholds are empirical data determined based on actual use, and may also be set to other specific values. When the working temperature of the interior of the power connector is greater than or equal to the second temperature threshold of 78° C., or when the working temperature of the interior of the charging control box is greater than or equal to 113° C., a charging safety protection mechanism will be triggered to stop charging the electric vehicle, so as to avoid the fire that may be caused by the increase of the charging temperature or the damage to the electrical elements in the charging device.

In an embodiment of the present disclosure, the electric vehicle is stopped from being charged when the first working temperature is greater than or equal to the second temperature threshold, and the second working temperature is greater than or equal to the fifth temperature threshold.

In this step, when the working temperature of the interior of the power connector is greater than or equal to the second temperature threshold of 78° C., and the working temperature of the interior of the charging control box is greater than or equal to 113° C., the charging safety protection mechanism will be triggered to stop charging the electric vehicle, so as to avoid the fire that may be caused by the increase of the charging temperature or the damage to the electrical elements in the charging device.

In an embodiment of the present disclosure, charging the electric vehicle with the charging power lower than or equal to the first charging power, when the first working temperature decreases to be less than or equal to the first temperature threshold further includes:

- stopping charging the electric vehicle when the second working temperature is continuously greater than or equal to the fourth temperature threshold within another predetermined time interval.

In this step, when the second working temperature is continuously greater than or equal to the fourth temperature threshold, the electric vehicle is stopped from being charged, regardless of the magnitude of the first working temperature, i.e., no matter whether the first working temperature is less than the first temperature threshold, so as to protect the electrical elements in the charging control box.

In an embodiment of the present disclosure, after stopping charging the electric vehicle, the method further includes:

- recording a reason for stopping charging the electric vehicle this time.

In this step, the reason for stopping charging the electric vehicle this time is recorded as that the first working temperature is continuously greater than or equal to the first temperature threshold, if the electric vehicle is stopped from being charged because the first working temperature is continuously greater than or equal to the first temperature threshold within a predetermined time interval;

- the reason for stopping charging the electric vehicle this time is recorded as that the first working temperature is greater than or equal to the second temperature threshold, if the electric vehicle is stopped from being charged because the first working temperature is greater than or equal to the second temperature threshold;
- the reason for stopping charging the electric vehicle this time is recorded as that the second working temperature is greater than or equal to the fifth temperature threshold, if the electric vehicle is stopped from being charged because the second working temperature is greater than or equal to the fifth temperature threshold;
- the reason for stopping charging the electric vehicle this time is recorded as that the first working temperature is greater than or equal to the second temperature threshold and the second working temperature is greater than or equal to the fifth temperature threshold, if the electric vehicle is stopped from being charged because the first working temperature is greater than or equal to the second temperature threshold and the second working temperature is greater than or equal to the fifth temperature threshold; and
- the reason for stopping charging the electric vehicle this time is recorded as that the second working temperature is continuously greater than or equal to the fourth temperature threshold, if the electric vehicle is stopped from being charged because the second working temperature is continuously greater than or equal to the fourth temperature threshold in another predetermined time interval.

The reason for stopping charging the electric vehicle this time recorded in this embodiment is stored in a memory for a query by the charging control unit.

In an embodiment of the present disclosure, after stopping charging the electric vehicle, the method further includes:

- determining the reason for stopping charging the electric vehicle this time, when the first working temperature decreases below the first temperature threshold and the second working temperature decreases below the fourth temperature threshold; and
- controlling the charging of the electric vehicle according to the reason for stopping charging the electric vehicle this time.

In this step, when the first working temperature of the interior of the power connector is lower than the first temperature threshold and the working temperature of the interior of the charging control box is lower than the fourth temperature threshold, it means that the situation that the temperature of the electrical element is greater than or equal to the safety threshold during charging the electric vehicle has been suppressed by stopping the charging, and the temperature of the electrical element in the charging device has been decreased to a safe temperature range, so the charging of the electric vehicle can be restored. However, the working temperatures of different charging devices may represent different meanings, such as the damage, failure or abnormality of the charging device. Therefore, it is necessary to analyze whether the charging can be restored according to the reason for stopping charging the electric vehicle this time.

In an embodiment of the present disclosure, controlling the charging of the electric vehicle according to the reason for stopping charging the electric vehicle this time further includes:

- not restoring the charging of the electric vehicle, if the reason for stopping charging the electric vehicle this time is that the second working temperature is greater than or equal to the fifth temperature threshold, or if the reason for stopping charging the electric vehicle this time is that the first working temperature is greater than or equal to the second temperature threshold, or if the reason for stopping charging the electric vehicle this time is that the first working temperature is greater than or equal to the second temperature threshold and the second working temperature is greater than or equal to the fifth temperature threshold.

In an embodiment of the present disclosure, controlling the charging of the electric vehicle according to the reason for stopping charging the electric vehicle this time further includes:

restoring the charging of the electric vehicle, if the reason for stopping charging the electric vehicle this time is that the second working temperature is greater than or equal to the fourth temperature threshold, or if the reason for stopping charging the electric vehicle this time is that the first working temperature is greater than or equal to the first temperature threshold; or if the reason for stopping charging the electric vehicle this time is that the first working temperature is greater than or equal to the first temperature threshold and the second working temperature is greater than or equal to the fourth temperature threshold.

In this step, when the first working temperature of the interior of the power connector is lower than the first temperature threshold and the second working temperature of the interior of the charging control box is lower than the fourth temperature threshold, it means that the temperature of the electrical element of the charging device has been decreased to a safe charging range, and the reason for stopping charging the electric vehicle this time is merely the temporary temperature increase, so that the charging of the electric vehicle can be restored when the charging safety problem that may be caused by the reason such as the damage of the electrical element or the control failure is ruled out.

In an embodiment of the present disclosure, obtaining the first working temperature of the interior of a power connector and the second working temperature of the interior of a charging control box further includes:

obtaining a first working temperature of a live wire terminal and/or a neutral wire terminal in the power connector by disposing at least one temperature detection unit; and obtaining a second working temperature of a printed circuit board and/or a printed circuit board in the charging control box by disposing at least one temperature detection unit.

In this step, by disposing a plurality of temperature detection units on the live wire terminal and/or the neutral wire terminal in the power connector, the working temperature of the electrical elements in the charging device can be obtained directly and more quickly, thereby facilitating the rapid response of the corresponding charging strategy. In addition, by obtaining the working temperature of the electrical element in the charging control box from the printed circuit board in the charging control box, the working temperature of the charging device can be obtained directly and more quickly, thereby facilitating the rapid response of the corresponding charging strategy.

By mounting the temperature detection unit on the live wire terminal and/or the neutral wire terminal, or on the relay of the printed circuit board in the charging control box or the connection terminal of the connector, the sampling accuracy of the temperature detection unit can be can improved from 1° C. in the prior art to 0.5° C. in the present disclosure, the deviation of the actual temperature can be reduced from ±3° C. in the prior art to ±0.5° C. in the present disclosure, the temperature sampling time can be reduced from 10 ms in the prior art to 1 ms in the present disclosure, and the temperature detection reliability can be changed from the one-way control in the prior art (controlled by a comparator or a control unit alone) to a dual-way control in the present disclosure (controlled by the comparator in conjunction with the control unit). In addition, the present disclosure further provides a compensation mechanism, i.e., a reference voltage of the comparator is regulated through the control of the control unit, thereby compensating for a drift of the reference voltage in the prior art.

In an embodiment of the present disclosure, obtaining the first working temperature of the live wire terminal and/or the neutral wire terminal in the power connector by the plurality of temperature detection units further includes:

collecting a first working temperature of a live wire terminal and/or a neutral wire terminal in the power connector by the plurality of temperature detection units connected in series or parallel and obtaining the first working temperature through one signal transmission line and one ground wire;

obtaining the second working temperature of the printed circuit board in the charging control box by the plurality of temperature detection units further includes:

collecting a second working temperature of a printed circuit board in the charging control box by the plurality of temperature detection units connected in series or parallel and obtaining the second working temperature through another signal transmission line and another ground wire.

In this step, in order to reduce the weight of the wire cable for transmitting the first working temperature and the second working temperature along the charging cable, the outputs of the plurality of temperature detection units are merged, i.e., the first working temperature is transmitted through one signal transmission line and the corresponding ground wire, the second working temperature is transmitted through another signal transmission line and the corresponding ground wire, and both of the signal transmission lines transmitting the first working temperature and the second working temperature only transmit a highest working temperature obtained by the plurality of temperature detection units, thereby reducing the weight of the charging cable and increasing the reliability of the whole charging device.

In an embodiment of the present disclosure, obtaining the first working temperature of the interior of the power connector and the second working temperature of the interior of the charging control box further includes:

performing a shielded protection on the obtained first working temperature and the obtained second working temperature.

In this step, by using shielded wires as the line and corresponding ground wire for transmitting the first working temperature signal, and the line and corresponding ground wire for transmitting the second working temperature signal, the interference of the charging current on the weak electric signal of the working temperature can be further reduced, so that the detected working temperature and the control of the charging power are more accurate.

In an embodiment of the present disclosure, when the first working temperature is greater than or equal to the first temperature threshold and less than the second temperature threshold, and the second working temperature is less than the fourth temperature threshold, a charging power higher than the second charging power is output to the electric vehicle. For example, the charging power may be between the first charging power and the second charging power or may be the first charging power.

In an embodiment of the present disclosure, when the first working temperature is less than or equal to the first temperature threshold, and the second working temperature is greater than or equal to the fourth temperature threshold and less than the fifth temperature threshold, a charging power higher than the second charging power is output to the electric vehicle, wherein the charging power may be the second charging power, or may be lower than or equal to the first charging power.

In an embodiment of the present disclosure, when the first working temperature is less than the first temperature threshold and the second working temperature is less than the fourth temperature threshold, a charging power higher than the second charging power is output to the electric vehicle, wherein the charging power may be any value between the first charging power and the second charging power, and may also be, for example, the first charging power. In an embodiment of the present disclosure, when the second working temperature decreases to be lower than or equal to the fourth temperature threshold, the electric vehicle is charged with a charging power lower than or equal to the first charging power and greater than 0, wherein the charging power may be between the first charging power and the second charging power, or may be less than the second charging power, or may be the second charging power.

In an embodiment of the present disclosure, the first temperature threshold is not equal to the fourth temperature threshold, wherein the fourth temperature threshold is greater than the first temperature threshold.

The second temperature threshold is not equal to the fifth temperature threshold, wherein the fifth temperature threshold is greater than the second temperature threshold.

Since the power connector and the charging control box have different heat dissipation structures and different heat dissipation coefficients, the upper and lower thresholds of each device are set according to the characteristics of different devices, so as to more accurately determine the cause of the charging heat.

By adopting the method of the embodiments of the present disclosure, the charging efficiency can be improved and the charging time can be shortened on the premise of ensuring the charging safety of the electric vehicle. By regulating the charging power according to the first working temperature of the power connector and the second working temperature of the interior of the charging control box, the charging safety of the electric vehicle can be further improved.

Figure 5:
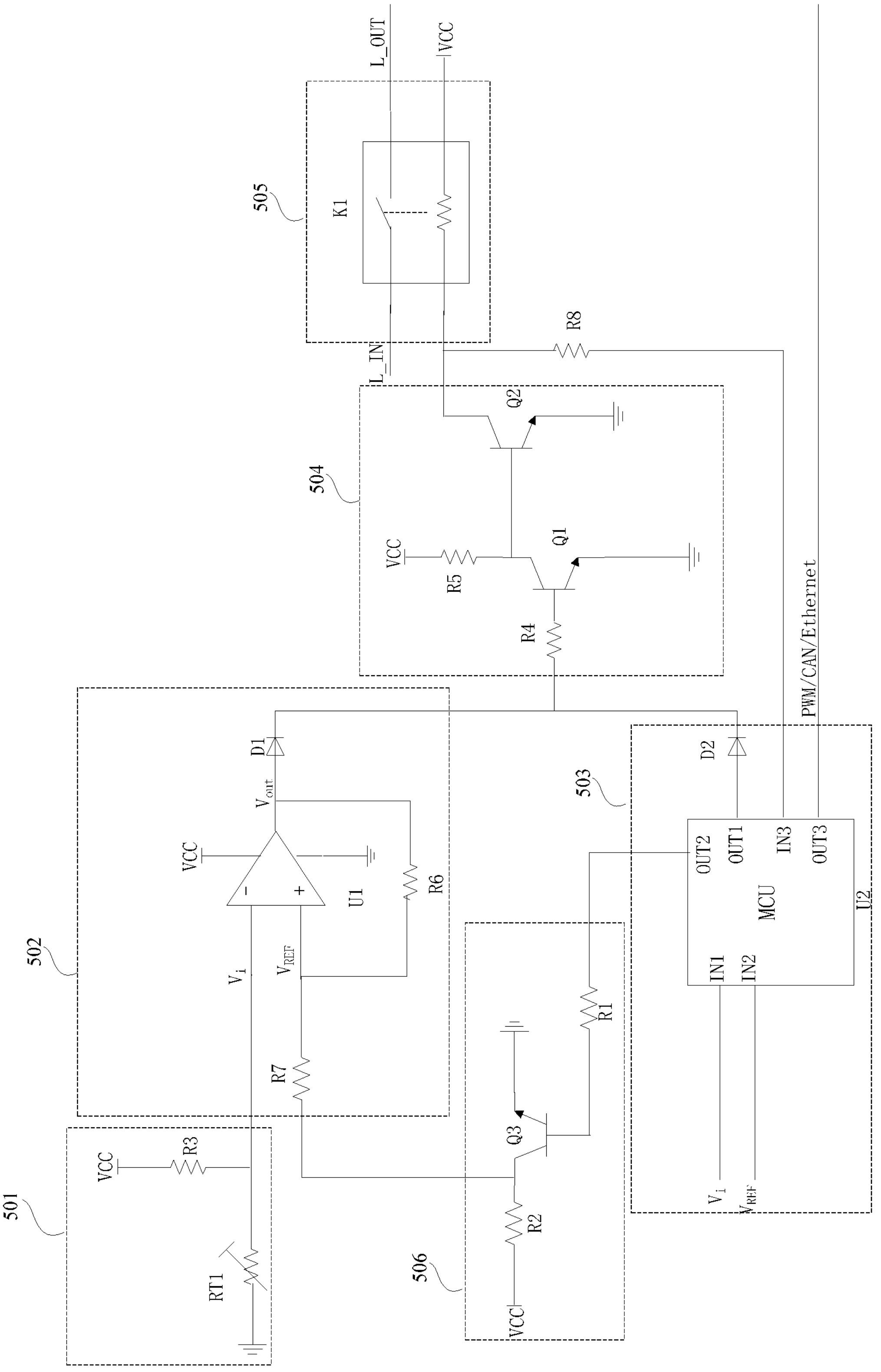
FIG. 5 illustrates a specific circuit diagram of a charging control apparatus according to an embodiment of the present disclosure.

FIG. 5 illustrates a specific circuit diagram of a charging control apparatus according to an embodiment of the present disclosure, and depicts a circuit structure of the charging control apparatus. The temperature detection unit 501 may be a thermistor, a thermocouple, a resistor temperature detector, a digital sensor, etc., wherein a thermistor with a positive temperature coefficient (PTC) or a negative temperature coefficient (NTC) may be adopted, such as an NTC type thermistor RT1 illustrated in FIG. 5, and information of the working temperatures (e.g., temperatures of electrical elements) reflected by different temperature detection units may be expressed as different temperature voltages. In this embodiment, the temperature detection unit 501 is further connected to a voltage division resistor R3 configured to set the temperature voltage output by the temperature detection unit to meet the requirement of a comparison unit 502.

Figure 7A:
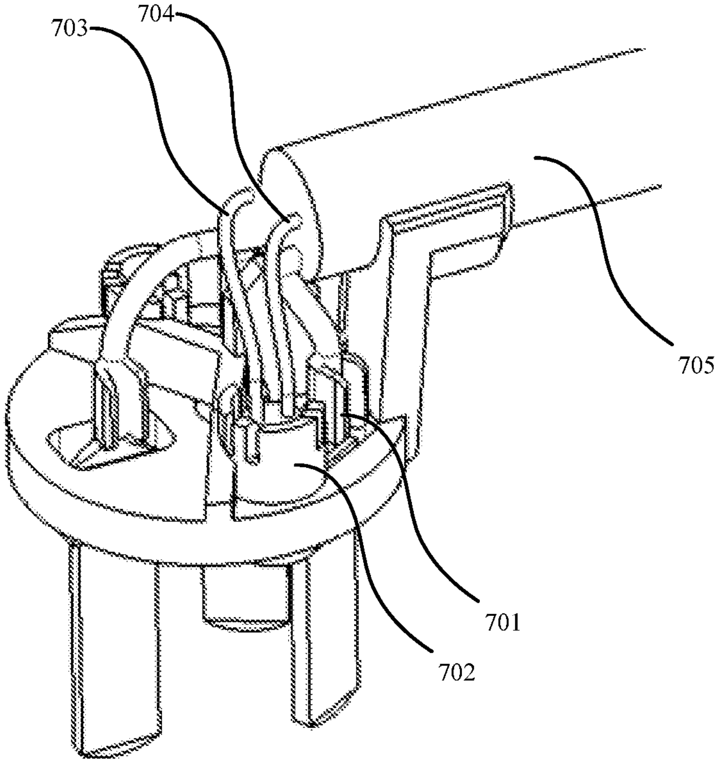
FIG. 7*a* illustrates a schematic structural diagram of a temperature detection unit in a power connector according to an embodiment of present disclosure.

For the sake of clarity, only one temperature detection unit 501 is illustrated in the drawing of this embodiment, but according to the aforementioned embodiments, there may be a plurality of temperature detection units 501, which are respectively disposed in the power connector and on the printed circuit board of the charging control box. FIG. 7*a* illustrates a schematic structural diagram of a temperature detection unit in a power connector of according to an embodiment of the present disclosure, including a live wire terminal 701 in the power connector, a temperature detection unit 702 mounted on the live wire terminal, a signal transmission line 703 for transmitting a working temperature obtained by the temperature detection unit 702, a corresponding ground wire 704, and a charging cable 705. The temperature detection unit 702 is fixed on the live wire terminal of the power connector by insulative and heat-conductive silica gel. The signal transmission line 703 and the corresponding ground wire 704 of the temperature detection unit 702 are disposed along the charging cable 705 and wrapped in an insulative outer layer of the charging cable 705, and transmit a temperature voltage signal of the working temperature to the charging control unit to control the charging strategy. According to the aforementioned embodiments, a plurality of temperature detection units 501 may be disposed on the live wire terminal and/or the neutral wire terminal in the power connector. The temperature detection units 501 are fixed to the live wire terminal and/or the neutral wire terminal in the power connector by the insulative and heat-conductive silica gel. The plurality of temperature detection units 501 may also be disposed on the printed circuit board in the charging control box in the charging cable, and fixed thereto by the insulative and heat-conductive silica gel. The temperature voltage $V_i$ representing the working temperature obtained by the temperature detection unit 501 is determined by the equation: $V_i=[RT1/(R3+RT1)]*VCC$, where RT1 (taking NTC as an example) decreases with the increase of the temperature, and then $V_i$ decreases.

Figure 7B:
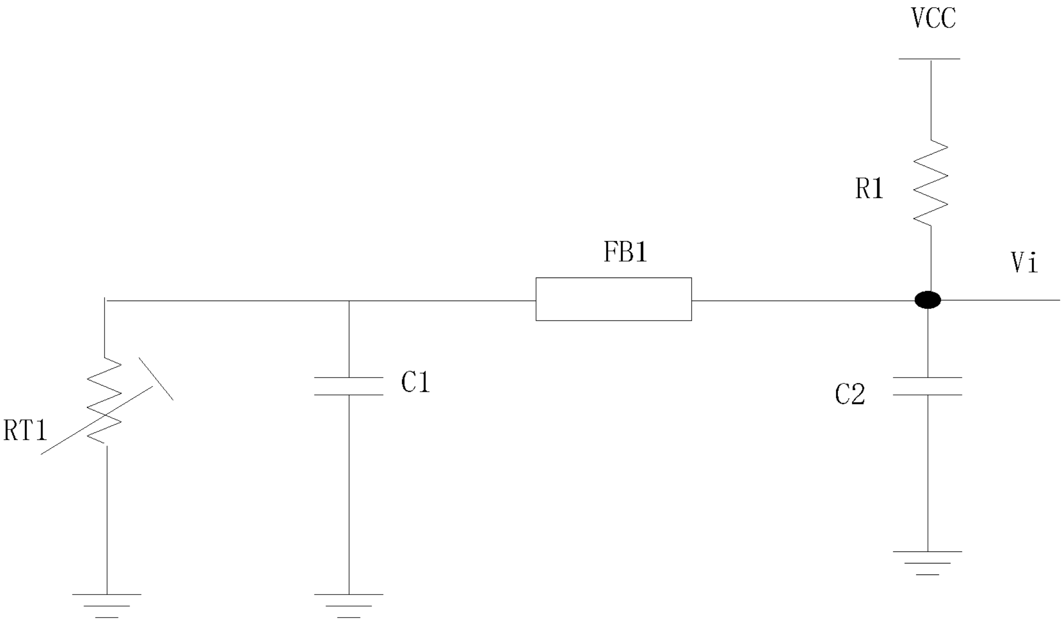
FIG. 7*b* illustrates a schematic circuit diagram of a temperature detection unit according to an embodiment of present disclosure.

FIG. 7*b* illustrates a schematic circuit diagram of a temperature detection unit according to an embodiment of the present disclosure. In FIG. 7*b*, by performing filtration processing on the temperature detection unit, it is possible to prevent the electric signal in the high-voltage charging cable from affecting the temperature voltage of the weak electric signal when the temperature detection unit transmits the temperature voltage of the working temperature to the charging control unit through the signal transmission line along the charging cable. Therefore, in this embodiment, the thermistor RT1 is interfered by a power frequency signal, and a x-type filter is formed by a capacitor C1, a resistor FBI and a capacitor C2 to attenuate the interference of the power frequency signal.

As an aspect of the embodiments of the present disclosure, there may be a plurality of comparison units 502 in correspondence with the number of the temperature detection units 501, i.e., each of the temperature detection units 501 is corresponding to one comparison unit 502. Similarly, for the sake of clarity, only one comparison unit 502 is illustrated in the embodiment of FIG. 5, and in other embodiments, a plurality of comparison units may also be included to determine the comparison relationships between the first working temperature and the corresponding temperature threshold, and between the second working temperature and the corresponding temperature threshold. The comparison unit 502 may be a hysteresis comparator, a first input end of which is connected to the temperature voltage output by the temperature detection unit 501, a second input end of which is connected to the reference voltage through a resistor R7, and an output end of which is connected to an input end of a driving unit 504 to output a first comparison result voltage to the driving unit 504. The output end of the hysteresis comparator is connected to the second input end through a resistor R6 connected in series.

In a case where there is only one reference voltage, when an amplitude of the temperature voltage input by the first input end of the comparison unit is close to the reference voltage, it is possible to cause an erroneous jump of the output voltage if a noise interference of the first input end is large and a comparison response speed is fast enough. In order to increase the anti-interference capability of the comparison unit, the embodiment provides the hysteresis comparator, which means that two reference voltages are provided. When the input temperature voltage representing the working temperature transitions from a low level to a high level, the output of the comparison unit 502 will not change unless the temperature voltage reaches a first reference voltage; and when the input temperature voltage transitions from a high level to a low level, the output of the comparison unit will not change unless the input temperature voltage decreases to a second reference voltage. Therefore, the structure of the comparison unit in the above embodiment has a hysteresis, i.e., an inertia, so that a slight change of the input temperature voltage will not cause the jump of the output voltage of the comparison unit, and then the comparison unit has the anti-interference capability.

The first comparison result voltage output by the comparison unit 502 may be at a high level or a low level, which depends on the structure of the driving unit 504, and has the same meaning as a high level and a low level of the second comparison result voltage output by the charging control unit 503 according to the comparison between the temperature voltage and a preset threshold as described later. That is, for example, when the first comparison result voltage output by the comparison unit 502 indicates that the working temperature (the temperature voltage) is higher than the preset temperature (the reference voltage), the first comparison result voltage is output at a high level. For the sake of simplicity, the drawing for this embodiment only illustrates one comparison unit 502, which may be configured to compare the first working temperature with the second temperature threshold, and there may be other comparison units configured to compare the second working temperature with the fifth temperature threshold. At this time, the charging control unit 503 should output the second comparison result voltage at a high level when judging that the working temperature (temperature voltage) is higher than the preset temperature (e.g., the second temperature threshold or the fifth temperature threshold), and vice versa. In this way, the high levels of the output comparison results are of the same meaning, and the low levels of the output comparison results are of the same meaning, thereby realizing the multiple temperature control protection.

As an aspect of the embodiments of the present disclosure, the charging control unit 503 is connected to the temperature detection unit 501 to obtain the temperature voltage of the first working temperature and the temperature voltage of the second working temperature; and the charging control unit 503 is connected to the input end of the driving unit 504 to output the second comparison result voltage to the driving unit 504. In other embodiments, the charging control unit 503 may be connected to a plurality of temperature detection units 501, and regulate the charging power according to the aforementioned charging strategy, or stop charging the electric vehicle.

In this embodiment, the charging control unit 503 may be a microprocessor (MCU), which receives a signal through IN pins (IN1 to IN3), output the signal through OUT pins (OUT1 to OUT3), and converts the temperature voltage into a digital form to be compared with a preset threshold. For example, when a numerical value of the temperature voltage of the first working temperature is greater than or equal to the second temperature threshold, a second comparison result voltage indicating to switch off a switch unit 505 is output, or when a numerical value of the temperature voltage of the second working temperature is greater than or equal to the fifth temperature threshold, a second comparison result voltage indicating to switch off the switch unit 505 is output; and when the numerical value of the temperature voltage of the first working temperature is less than the second temperature threshold, a second comparison result voltage indicating to switch on the switch unit 505 is output (or controlled according to the aforementioned charging strategy). The second comparison result voltage may be at a high level or a low level, depending on the structure of the driving unit 504.

As an aspect of the embodiments of the present disclosure, the driving unit 504 includes a first transistor Q1, and a second triode Q2 is omitted compared with FIG. 5. The first transistor Q1 includes a collector connected to a power supply VCC, a base connected to the comparison unit 502 and the charging control unit 503 for receiving both the first comparison result voltage output by the comparison unit 502 and the second comparison result voltage output by the charging control unit 503, and an emitter that is grounded. The collector is further connected to the switch unit 505 which is switched off when the first transistor Q1 is turned on and switched on when the first transistor Q1 is turned off.

In this embodiment, when the base is connected to the comparison unit 502 and the charging control unit 103 for receiving both the first comparison result voltage output by the comparison unit 502 and the second comparison result voltage output by the charging control unit 503, the first transistor Q1 is turned on when either of the first comparison result voltage and the second comparison result voltage is at a high level. That is, when the comparison unit 502 determines that the current working temperature exceeds the second temperature threshold and outputs the first comparison result voltage at a high level, or the charging control unit 503 determines that the current working temperature exceeds the second temperature threshold and outputs the second comparison result voltage at a high level, the base of the first transistor Q1 receives the high level so as to be turned on, thereby switching off the switch unit 505.

As an aspect of the embodiments of the present disclosure, the driving unit 504 includes a first transistor Q1 and a second transistor Q2. The first transistor Q1 has a collector connected to a power supply VCC, a base connected to the comparison unit 502 and the charging control unit 503 for receiving both the first comparison result voltage output by the comparison unit 502 and the second comparison result voltage output by the charging control unit 503, and an emitter that is grounded. The second transistor Q2 includes a collector connected to the switch unit 505, a base connected to the collector of the first transistor Q1, and an emitter that is grounded. When the first transistor Q1 is turned on, the second transistor Q2 is turned off and the switch unit 505 is switched off. When the first transistor Q1 is turned off, the second transistor Q2 is turned on and the switch unit 505 is switched on.

In the above embodiment, the function of the driving unit 504 may also be realized by other means, and a PNP triode or an MOS transistor may be used to drive the switch unit 505, and the switch unit may be, for example, a relay. For example, the first comparison result voltage output by the comparison unit 502 may be converted into a digital form to be OR-operated with the second comparison result voltage in a digital form output by the charging control unit 503. When one of the first and second comparison results in digital form is at a high level, it means that the working temperature exceeds the second temperature threshold, and the switch unit 505 is switched off. The above judgment and operation may be realized by a gate circuit in a digital circuit, or any other form of judgment and operation circuit, which will not be described here.

As an aspect of the embodiments of the present disclosure, the charging control apparatus further includes a compensation unit 506, which is connected between the comparison unit 502 and the charging control unit 503. When detecting a deviation of the reference voltage, the charging control unit 503 outputs a regulation voltage to the compensation unit 506 to regulate the reference voltage.

In this embodiment, when the reference voltage drifts due to aging of the electrical components that output the reference voltage to the comparison unit 502 or changing of the electrical components resulting from the change of the working temperature, the reference voltage may be regulated by the charging control unit 503 to be more accurate, thereby improving the accuracy of temperature judgment by the comparison unit 502. The charging control unit 503 obtains the reference voltage, generates a regulation voltage for the reference voltage according to the comparison between the temperature voltage and the preset threshold, and applies the regulation voltage to the reference voltage.

As an aspect of the embodiments of the present disclosure, the compensation unit 506 further includes a third transistor Q3, which includes a collector connected to a power supply VCC and the reference voltage of the comparison unit 502, a base connected to the charging control unit 503, and an emitter that is grounded. When the charging control unit 503 determines that the received reference voltage is not equal to a preset threshold, the charging control unit 503 outputs a regulation voltage to the base of the third transistor Q3 to control the reference voltage on the collector of the third transistor Q3.

In this embodiment, an input pin of the charging control unit 503 is connected to the reference voltage of the second input end of the comparison unit 502 to obtain the reference voltage of the second input end of the comparison unit 502. When the reference voltage drifts due to the change of the electrical element, the reference voltage obtained by the charging control unit 503 is not equal to the preset threshold. For example, the set reference voltage is 0.5 V, and the set preset threshold is also 0.5 V, but the drifted reference voltage is 0.48 V. At this time, when determining that the collected reference voltage is different from the preset threshold, the charging control unit 503 controls the output pin to output a regulation voltage, and turns on the third transistor Q3, so that the reference voltage input to the second input end of the comparison unit 502 can be regulated from 0.48 V back to the set 0.5 V.

As an aspect of the embodiments of the present disclosure, the charging control unit 503 further includes a first output pin configured to output a pulse modulation signal (PWM) according to the temperature voltage to regulate the power of the output charging current, and output the pulse modulation signal to the electric vehicle through an interface connected to the electric vehicle.

In this embodiment, as the temperature of a component of the charging device increases or decreases, the charging control unit 503 may reduce or increase the power of the output charging current according to the degree of the temperature increase or decrease (when increasing, the temperature does not reach the preset threshold, i.e., the temperature does not exceed a safe charging temperature). For example, during AC charging, the charging current is regulated from 8 A to 6 A by the PWM signal due to the temperature increases. The PWM signal for regulating the output charging power is transmitted to a battery management system (BMS) of the electric vehicle, and the BMS system charges the battery with the corresponding charging current by a power regulation unit of the electric vehicle, thereby reducing the intensity of the charging current. The charging of the electric vehicle can be maintained after the temperature of components of the charging control apparatus increases, rather than being directly stopped as in the prior art, so that the charging efficiency can be improved, and the user's experience in charging the electric vehicle can be improved.

As an aspect of the embodiments of the present disclosure, the charging control unit 503 further includes a second output pin configured to output a charging power regulation signal (CAN/Ethernet) according to the temperature voltage, and output the charging power regulation signal to the electric vehicle through an interface connected to the electric vehicle.

The charging control apparatus further includes a power regulation unit connected between the charging control unit 503 and the switch unit 505, and configured to regulate the power of the output charging current according to the charging power regulation signal.

In this embodiment, as the temperature of a component, such as a power connector, of the charging device increases or decreases, the charging control unit 503 may reduce or increase the power of the output charging current according to the degree of the temperature increase or decrease (when increasing, the temperature does not reach the preset threshold, i.e., the temperature does not exceed a safe charging temperature). For example, during DC charging, the charging control unit 503 reduces or increases the power of the charging current output by the power regulation unit by outputting a charging power regulation signal to the power regulation unit. When the working temperature of the interior of the power connector exceeds the temperature threshold (e.g., the first working temperature is greater than or equal to the second temperature threshold, or the second working temperature of the printed circuit board in the charging control box is greater than or equal to the fifth temperature threshold, etc.), i.e., exceeds the safe charging temperature, the charging control unit 503 or the comparison unit 502 outputs a driving signal to drive the switch unit 505 to be switched off. After the switch unit 505 is switched off, the power regulation unit stops outputting the charging current to the electric vehicle, thereby decreasing the temperature in the charging control apparatus and the temperature of the battery of the electric vehicle and ensuring the charging safety. The charging power regulation signal output by the charging control unit 503 may also be transmitted to the BMS system of the electric vehicle through a CAN bus or an Ethernet bus of a charging gun on the charging control apparatus, so that the BMS system can charge the battery at corresponding power with the charging current output from the switch unit 505 of the charging control apparatus according to the charging power regulation signal, thereby reducing the intensity of the charging current. Therefore, the charging of the electric vehicle can be maintained after the temperature of components of the charging control apparatus increases, rather than being directly stopped as in the prior art, so that the charging efficiency can be improved, and the user's experience in charging the electric vehicle can be improved.

Referring to FIG. 5, VCC is an anode (hereinafter referred to as the power supply for abbreviation) of a power supply voltage source, the GND is a cathode of the power supply voltage source, $V_{REF}$ is a reference voltage, i.e., a set temperature threshold, which is connected to a resistor R7, and the other end of the resistor R7 is connected to a positive input pin (i.e., a second input end) of an operational amplifier. The reference voltage $V_{REF}$ may be a fixed value, or a preset threshold inside the charging control unit 503, in which case the charging control apparatus can automatically regulate the temperature threshold. A thermistor RT1 is a thermosensitive element, with one end 40) connected to the ground, and the other end connected to the resistor R3 to constitute the temperature detection unit 501 which is connected to an input end of the comparison unit 502, i.e., a connection point between the resistor R3 and the thermistor RT1 is connected to a negative input pin (i.e., a first input end) of the operational amplifier U1. The thermistor RT1 and the resistor R3 constitute a voltage division circuit, and the thermistor RT1 may be an NTC type thermistor. When the working temperature of the interior of the power connector increases, a resistance value of thermistor RT1 decreases, and a voltage value of a divided temperature voltage $V_i$ decreases, whereas when the temperature decreases, the $V_i$ increases. The resistor R6 is a feedback resistor connected between an output pin (an output end) of the operational amplifier U1 and the positive input pin (i.e., the second input end).

When $V_i<V_{REF}$, the operational amplifier U1 outputs a high level; and when $V_i>V_{REF}$, U1 outputs a low level. $V_{out}$ is the output end of the operational amplifier U1, and the $V_{out}$ is connected to one end of a diode D1, the other end of the diode D1 is connected to a resistor R4, the other end of the resistor R4 is connected to the base of the first transistor Q1 of the driving unit 504. A resistor R5 has one end connected to the power supply VCC and the other end connected to the collector of the first transistor Q1. The second transistor Q2 has the base connected to a connection point between the collector of the first transistor Q1 and the resistor R5, the emitter connected to the ground, and the collector connected to the control end of the switch unit 505. A switch K1 of a power supply network is used to control a path of the charging current supplied to the electric vehicle, and when the switch K1 is switched off, the charging current supplied to the electric vehicle is directly cut off to terminate the charging process. When the $V_{out}$ outputs at a high level, the first transistor Q1 is turned on and the second transistor Q2 is turned off, and the switch K1 of a power supply network is switched off, so as to cut off the charging current output to the electric vehicle. When the $V_{out}$ outputs a low level, the first transistor Q1 is turned off, the second transistor Q2 is turned on, and the switch K1 of the power supply network is switched on to maintain the charging current output to the electric vehicle. L_IN, K1 and L_OUT constitute a path in the main power supply network. When the working temperature exceeds the temperature threshold, the $V_{out}$ outputs a high level to disconnect the power supply network, and the charging current output by L_OUT is 0.

The thermistor RT1 may be integrated with other electrical components such as the operational amplifier U1 or disposed separately. There may be one or more thermistors RT1, which may be located at different parts of the charging control apparatus to collect the working temperatures of those different parts or the temperatures of the electrical components, and for example, the thermistor RT1 is mounted in the power connector, in the printed circuit board of the charging control box.

The operational amplifier U1 may be a hysteresis comparator to avoid the frequency switching of the switch unit 505 between a switched-on state and a switched-off state when the working temperature of the switch K1 is close to the temperature threshold. When the first working temperature of the interior of the power connector is higher than or equal to T2 (the second temperature threshold), the switch unit 505 is switched off. When the first working temperature is lower than or equal to T1 (the first temperature threshold), the switch unit 505 is switched on. In other embodiments, when the second working temperature of the interior of the charging control box is higher than or equal to T5 (the fifth temperature threshold), the switch unit 505 is switched off, and the aforementioned embodiment and be referred to for detail. The T2 is greater than T1, and the difference between T2 and T3 may be changed by regulating resistance values of the resistor R6 and the resistor R7. A hysteresis voltage width ΔV is determined by the equation: $\Delta V=(R7/R6)\times(VH-VL)$, where VH is the VCC and VL is 0V. Two threshold voltages u+ and u− of the hysteresis comparator are determined by the equations: $u+=(VH-V_{REF})\times R7/(R7+R6)$, $u-=(VL-V_{REF})\times R7/(R7+R6)$. When the output voltage $V_{out}$ of the hysteresis comparator is equal to VH, then $V_{REF}$=u+. When the temperature voltage $V_i$ is greater than or equal to $V_{REF}$, the output voltage $V_{out}$ of the hysteresis comparator is changed to VL, and $V_{REF}$ is also changed to u−. Under this condition, when the temperature voltage $V_i$ is less than $V_{REF}$, the output voltage $V_{out}$ is changed to VH. Since u+-u−=ΔV, the hysteresis comparator has a lower sensitivity than the ordinary comparator, but its anti-interference capability is greatly improved.

In order to improve the charging safety of the electric vehicle, the charging control unit 503 collects the temperature voltage $V_i$ and the reference voltage $V_{REF}$. When it is detected that the reference voltage $V_{REF}$ deviates from the preset threshold, i.e., the reference voltage $V_{REF}$ changes, the compensation unit 506 regulates and corrects the value of the reference voltage $V_{REF}$ to improve the accuracy of the temperature judgment. One output end of the charging control unit 503 is connected to the resistor R1, the other end of the resistor R1 is connected to the base of the third transistor Q3, the emitter of the third transistor Q3 is connected to the GND, the collector of the third transistor Q3 is connected to one end of the resistor R2 and the reference voltage $V_{REF}$, and the other end of the resistor R2 is connected to the power supply VCC. The charging control unit 503 outputs a regulated voltage to control the duty ratio of the third transistor Q3, so as to regulate the reference voltage $V_{REF}$.

The charging control unit 503 also detects the state of the switch K1 through a feedback of a resistor R8 connected thereto. When the switch K1 remains a switched-on state while it is detected that the working temperature exceeds the temperature threshold (e.g., the first working temperature is greater than or equal to the second temperature threshold, and the second working temperature is greater than or equal to the fifth temperature threshold), it means that the comparison unit 502 fails to control the switch K1. The charging control unit 503 compares the $V_i$ with the preset threshold, and outputs a high level when the $V_i$ reaches or exceeds the preset threshold, and turns on the first transistor Q1 through the diode D2, and the second transistor Q2 is turned off, thereby disconnecting the power supply network. The comparison unit 502 and the charging control unit 503 realize a dual detection of the temperature detection unit 501 and the dual control of the driving unit 504, thereby improving the charging safety of the electric vehicle.

Figure 6A:
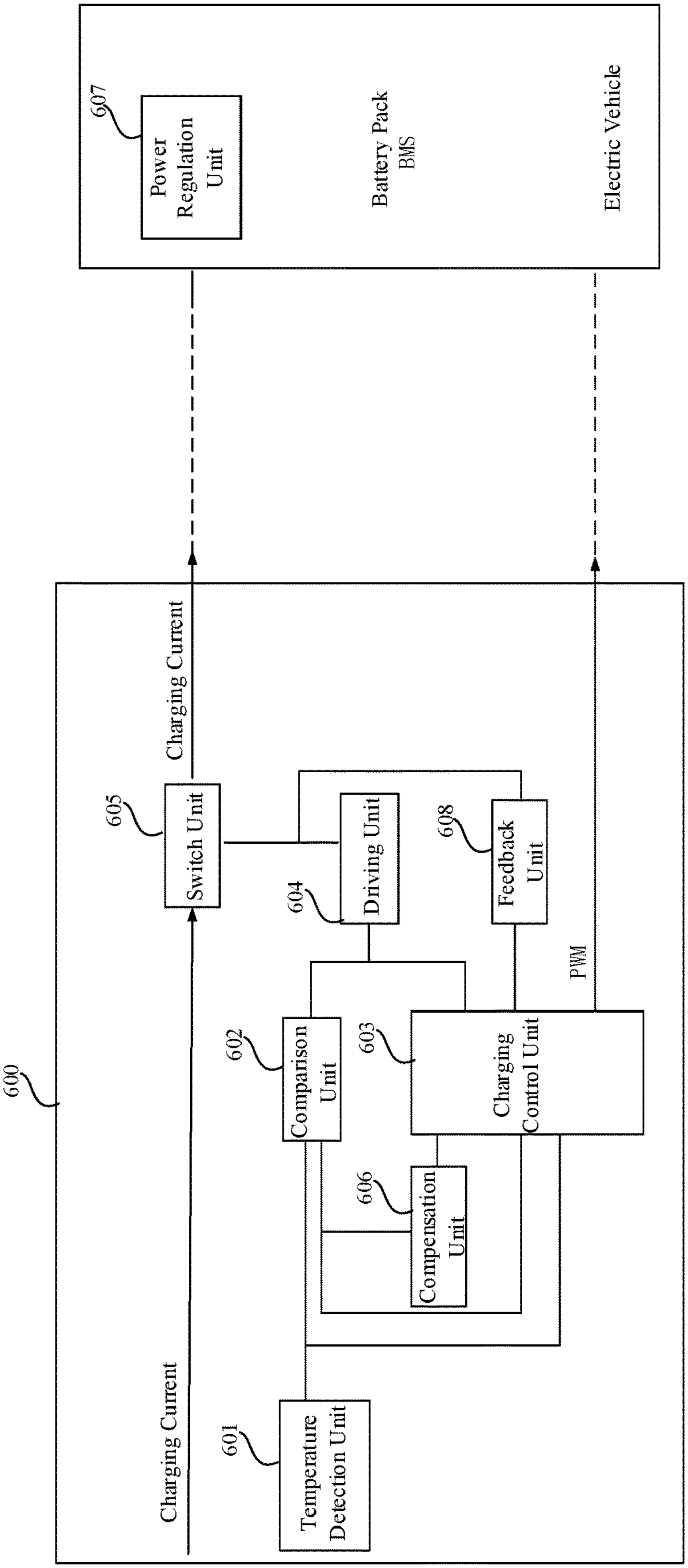
FIG. 6*a* illustrates a schematic diagram of a charging control apparatus and an electric vehicle charging structure according to an embodiment of present disclosure.

FIG. 6*a* illustrates a schematic diagram of a charging control apparatus and a charging structure for an electric vehicle according to an embodiment of the present disclosure, wherein an AC charging system is adopted. When the working temperature increases but does not exceed a set temperature threshold (e.g., the first working temperature increases but does not exceed a set second temperature threshold, or the second working temperature increases but does not exceed a set fifth temperature threshold), a charging control unit 603 of a charging control apparatus 600 outputs a regulated PWM signal. For example, when the charging current is 8A, the corresponding duty ratio (PWM signal) is 13.3%, and when the charging current is 6A, the corresponding duty ratio value (PWM signal) is 10%, so as to regulate the power of the charging current. The charging control unit 603 outputs the modified duty ratio signal for charging power regulation to the power regulation unit 607 of the electric vehicle, and the power regulation unit 607 reduces the charging current intensity under the control of the BMS system of the electric vehicle. When the temperature detection unit 601 detects that the working temperature of the interior of the power connector exceeds the second temperature threshold, the switching unit 605 is switched off to stop charging the electric vehicle. In other embodiments, the charging control unit 603 may also output a control signal of voltage to regulate the charging current.

In FIG. 6*a*, a feedback unit 608 is further included to obtain a driving signal of the driving unit 604, so that the charging control unit 603 can determine whether the driving unit 604 correctly drives the switch unit 605.

Figure 7C:
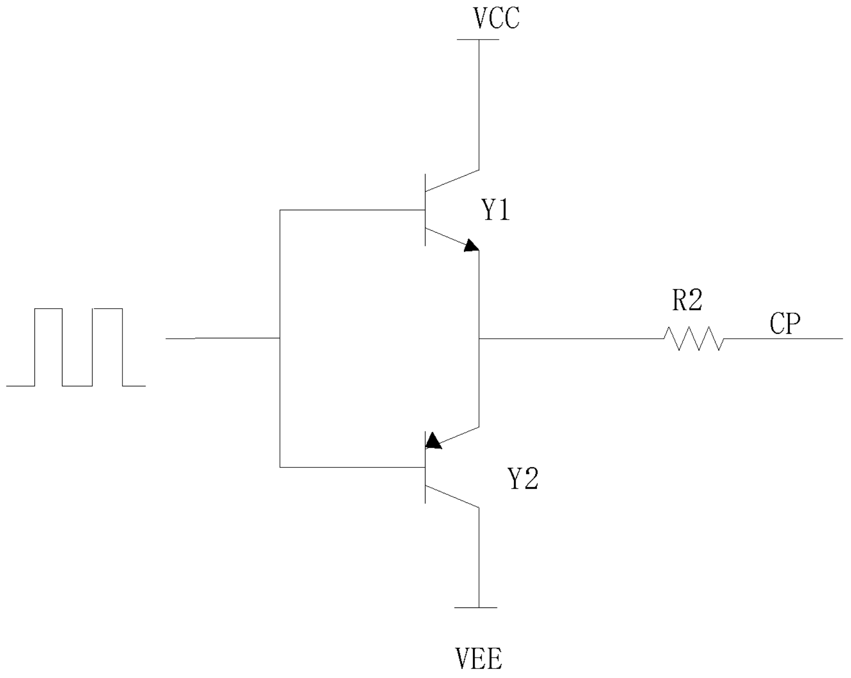
FIG. 7*c* illustrates a schematic structural diagram of a power regulation unit according to an embodiment of present disclosure.

FIG. 7*c* is a schematic structural diagram of a power regulation unit according to an embodiment of the present disclosure. As illustrated in FIG. 7, the power regulation unit 607 may be composed of a push-pull circuit. The charging control unit 603 outputs a modified PWM signal, and the CP terminal outputs a PWM signal with a VCC at a high level and a VEE at a low level. The duty ratio represents the maximum allowable charging current, and the charging power is reduced by reducing the duty ratio. In the circuit of this embodiment, a transistor Y1 is turned on in a positive half cycle and a transistor Y2 is turned on in a negative half cycle.

Figure 6B:
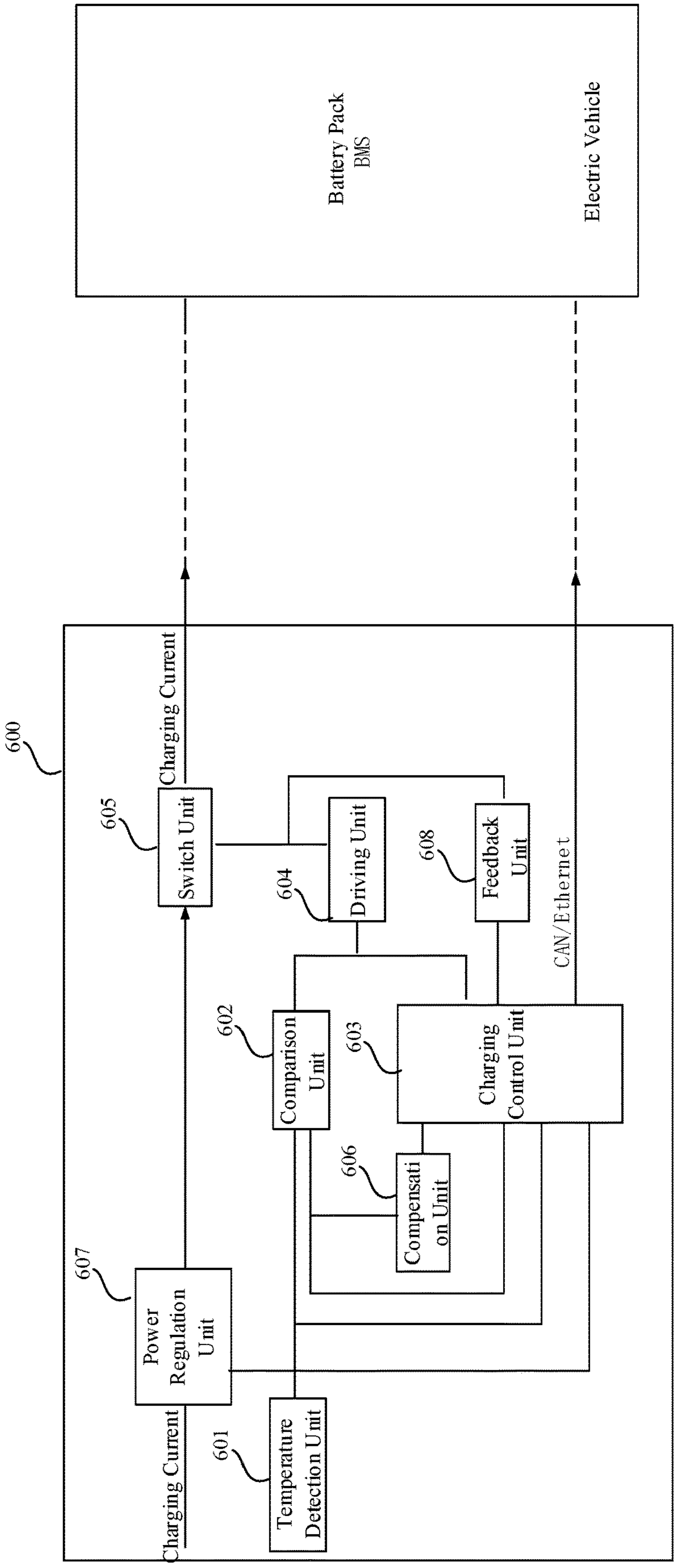
FIG. 6*b* illustrates a schematic diagram of a charging control apparatus and an electric vehicle charging structure according to another embodiment of present disclosure.

FIG. 6*b* illustrates a schematic diagram of a charging control apparatus and an electric vehicle charging structure according to another embodiment of present disclosure, wherein a DC charging system is adopted. When the working temperature increases but does not exceed a set temperature threshold (e.g., the first working temperature rises but does not exceed a set second temperature threshold, or the second working temperature rises but does not exceed a set fifth temperature threshold), the charging control unit 603 of the charging control apparatus 600 regulates the charging power to generate a charging power regulation signal, which is transmitted to the electric vehicle in the form of a CAN message through a CAN bus interface in a charging gun connected to the electric vehicle, thereby reducing the power of the charging current. Moreover, the charging power regulation signal is further output to the power regulation unit 607 in the charging control apparatus, and the power regulation unit 607 regulates the power of the output charging current (regulating the current or the voltage, or both) according to the charging power regulation signal, so as to charge the battery of the electric vehicle.

The power regulation unit 607 is configured to receive the charging current, regulate the power of the charging current and output it to the electric vehicle through the switch unit 605. The structure of the power regulation unit 607 may refer to FIG. 7*c*.

In the above embodiment, by reducing the power of the charging current to charge the battery of the electric vehicle, the temperatures of the electrical elements of the charging device can be decreased. When the working temperature detected by the charging control apparatus is lower than the temperature threshold (e.g., the first temperature threshold), the charging control unit 603 outputs a control command to the power regulation unit 607 according to the working temperature to restore the power of charging current, thereby improving the charging speed.

Through the above embodiments, the charging efficiency can be improved and the charging time can be shortened on the premise of ensuring the charging safety of the electric vehicle. By regulating the charging power according to the first working temperature of the power connector in conjunction with the second working temperature of the interior of the charging control box, the charging safety of the electric vehicle can be further improved.

An embodiment of the present disclosure further provides a computer device, including a memory, a processor, and a computer program stored in the memory and executable on the processor, wherein the processor is configured to execute the computer program to implement the following steps:

- obtaining a first working temperature of an interior of a power connector and a second working temperature of an interior of a charging control box during charging the electric vehicle with a charging power equal to the first charging power;
- reducing the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold; and
- charging the electric vehicle with the charging power lower than or equal to the first charging power, when the first working temperature decreases to be less than or equal to the first temperature threshold.

The computer device according to the embodiment of the present disclosure can also implement the method as illustrated in FIG. 4.

Corresponding to the method in FIG. 4, an embodiment of the present disclosure further provides a computer nonvolatile readable storage medium storing a computer program, wherein when being executed by a processor, the computer program implements the steps of the above method.

An embodiment of the present disclosure further provides a computer readable instruction, wherein when the instruction is executed by a processor, a program therein causes the processor to implement the method as illustrated in FIG. 4.

It should be understood that in various embodiments of the present disclosure, the sequential number of each process does not indicate the order of execution that should be determined according to the function and the internal logic, and also does not restrict the implementation process of the embodiments herein.

It should be further understood that in the embodiments of the present disclosure, the term 'and/or' is merely an association relationship describing the associated objects, and indicates that there may be three relationships. For example, A and/or B may indicate that A exists alone, A and B exist simultaneously, and B exists alone. In addition, the character '/' herein generally indicates that the associated objects are in an 'or' relationship.

Those skilled in the art can appreciate that the units and algorithm steps of the examples described in conjunction with the embodiments disclosed herein can be implemented by electronic hardware, computer software or a combination thereof, and in order to clearly illustrate the interchangeability between hardware and software, the compositions and steps of the examples have been generally described as above in terms of functions. Whether these functions are performed in hardware or software depends on the particular application and design constraints of the technical solution. Professionals can implement the described functions using different methods for each particular application, but such implementation should not be considered as going beyond the scope of the present disclosure.

It can be clearly understood by those skilled in the art that for the convenience and conciseness of the description, the specific working processes of the systems, apparatuses and units described above can refer to the corresponding processes in the foregoing method embodiments, and will not be repeated here.

In several embodiments provided herein, it should be understood that the disclosed systems, apparatuses and methods can be implemented in other ways. For example, the apparatus embodiments described above are merely illustrative, e.g., the unit partitioning is only a logical function partitioning, and other partitioning modes are possible during the actual implementation. For example, a plurality of units or components may be combined or integrated into another system, or some features may be omitted or not executed. In addition, the mutual coupling or direct coupling or communication connection illustrated or discussed may be an indirect coupling or communication connection through some interfaces, means or units, and may be in electrical, mechanical or other forms.

The units described as separate components may or may not be physically separated, and the components displayed as units may or may not be physical units, i.e., they may be located in one place or distributed to a plurality of network units. Some or all of the units can be selected according to the actual needs to achieve the objectives of the embodiments of the present disclosure.

In addition, the functional units in the embodiments of the present disclosure may be integrated into one processing unit, or each unit may be existed physically alone, or two or more units may be integrated into one unit. The integrated unit may be implemented in the form of hardware or a software functional unit.

If being implemented in the form of a software functional unit and sold or used as an independent product, the integrated unit may be stored in a computer readable storage medium. Based on such understanding, the essence of the technical solutions of the present disclosure, i.e., portions making contributions to the prior art, or all or part of the technical solutions may be embodied in the form of a computer software product, which is stored in a storage medium and includes several instructions for causing a computer device (e.g., a personal computer, a server, a network device, etc.) to perform all or part of the steps of the methods described in the embodiments of the present disclosure. The foregoing storage medium includes various media that can store program codes, such as a USB flash disk, a mobile hard disk, a Read-Only Memory (ROM), a Random-Access Memory (RAM), a magnetic disk, or an optical disk.

Specific embodiments are used herein to explain the principles and the implementations of the present disclosure, and the descriptions of the above embodiments are only intended to help understanding of the method and the core idea of the present disclosure. Meanwhile, those of ordinary skilled in the art can modify the implementations and the application scope according to the concept of the present disclosure. To sum up, the content of this specification should not be construed as limitations to the present disclosure.

The invention claimed is:

1. An electric vehicle charging control method, comprising:

obtaining a first working temperature of an interior of a power connector and a second working temperature of an interior of a charging control box during charging the electric vehicle with a charging power equal to the first charging power;

reducing the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold;

charging the electric vehicle with the charging power lower than or equal to the first charging power, when the first working temperature decreases to be less than or equal to the first temperature threshold;

stopping charging the electric vehicle when the first working temperature is continuously greater than or equal to the first temperature threshold within a predetermined time interval;

determining the reason for stopping charging the electric vehicle this time, when the first working temperature decreases below the first temperature threshold and the second working temperature decreases below the fourth temperature threshold; and controlling the charging of the electric vehicle according to the reason for stopping charging the electric vehicle this time, comprising:

not restoring the charging of the electric vehicle, if the reason for stopping charging the electric vehicle this time is that the second working temperature is greater than or equal to the fifth temperature threshold; or if the reason for stopping charging the electric vehicle this time is that the first working temperature is greater than or equal to the second temperature threshold; or if the reason for stopping charging the electric vehicle this time is that the first working temperature is greater than or equal to the second temperature threshold and the second working temperature is greater than or equal to the fifth temperature threshold.

2. The method according to claim 1, wherein the electric vehicle is stopped from being charged when the first working temperature is greater than or equal to the second temperature threshold; or, the electric vehicle is stopped from being charged when the second working temperature is greater than or equal to the fifth temperature threshold.

3. The method according to claim 1, wherein the electric vehicle is stopped from being charged when the first working temperature is greater than or equal to the second temperature threshold and the second working temperature is greater than or equal to the fifth temperature threshold.

4. The method according to claim 1, wherein charging the electric vehicle with the charging power lower than or equal to the first charging power, when the first working temperature decreases to be less than or equal to the first temperature threshold further comprises:

stopping charging the electric vehicle when the second working temperature is continuously greater than or equal to the fourth temperature threshold within another predetermined time interval.

5. The method according to claim 1 wherein after stopping charging the electric vehicle, the method further comprises:

recording a reason for stopping charging the electric vehicle this time.

6. The method according to claim 1, wherein controlling the charging of the electric vehicle according to the reason for stopping charging the electric vehicle this time further comprises:

restoring the charging of the electric vehicle, if the reason for stopping charging the electric vehicle this time is that the second working temperature is greater than or equal to the fourth temperature threshold; or if the reason for stopping charging the electric vehicle this time is that the first working temperature is greater than or equal to the first temperature threshold; or if the reason for stopping charging the electric vehicle this time is that the first working temperature is greater than or equal to the first temperature threshold and the second working temperature is greater than or equal to the fourth temperature threshold.

7. The method according to claim 1, wherein obtaining the first working temperature of the interior of the power connector and the second working temperature of the interior of the charging control box further comprises:

obtaining a first working temperature of a live wire terminal and/or a neutral wire terminal in the power connector by disposing at least one temperature detection unit; and obtaining a second working temperature of a printed circuit board and/or a printed circuit board in the charging control box by disposing at least one temperature detection unit.

8. The method according to claim 1, wherein when the first working temperature is greater than or equal to the first temperature threshold and less than the second temperature threshold, and the second working temperature is less than the fourth temperature threshold, the charging power higher than the second charging power is output to the electric vehicle.

9. The method according to claim 1, wherein when the first working temperature is less than the first temperature threshold and the second working temperature is greater than or equal to the fourth temperature threshold and less than the fifth temperature threshold, the charging power higher than the second charging power is output to the electric vehicle.

10. The method according to claim 1, wherein when the first working temperature is less than the first temperature threshold and the second working temperature is less than the fourth temperature threshold, the charging power higher than the second charging power is output to the electric vehicle.

11. The method according to claim 1, wherein when the second working temperature decreases to be lower than or equal to the fourth temperature threshold, the electric vehicle is charged with the charging power lower than or equal to the first charging power and greater than 0.

12. The method according to claim 1, wherein the first temperature threshold is not equal to the fourth temperature threshold.

13. The method according to claim 12, wherein the fourth temperature threshold is greater than the first temperature threshold.

14. The method according to claim 1, wherein the second temperature threshold is not equal to the fifth temperature threshold.

15. The method according to claim 14, wherein the fifth temperature threshold is greater than the second temperature threshold.

16. An electric vehicle charging control apparatus, comprising:

a power connector temperature detection unit provided in a power connector and configured to obtain a first working temperature of an interior of the power connector and a second working temperature of an interior of a charging control box during charging the electric vehicle with a charging power equal to the first charging power; and a charging control unit configured to:

reduce the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold, charge the electric vehicle with the charging power lower than or equal to the first charging power, when the first working temperature decreases to be less than or equal to the first temperature threshold;

stop charging the electric vehicle when the first working temperature is continuously greater than or equal to the first temperature threshold within a predetermined time interval;

determine the reason for stopping charging the electric vehicle this time, when the first working temperature decreases below the first temperature threshold and the second working temperature decreases below the fourth temperature threshold; and control the charging of the electric vehicle according to the reason for stopping charging the electric vehicle this time, comprising:

not restore the charging of the electric vehicle, if the reason for stopping charging the electric vehicle this time is that the second working temperature is greater than or equal to the fifth temperature threshold; or if the reason for stopping charging the electric vehicle this time is that the first working temperature is greater than or equal to the second temperature threshold; or if the reason for stopping charging the electric vehicle this time is that the first working temperature is greater than or equal to the second temperature threshold and the second working temperature is greater than or equal to the fifth temperature threshold.

17. An electric vehicle charging control method, comprising:

obtaining a first working temperature of an interior of a power connector and a second working temperature of an interior of a charging control box during charging the electric vehicle with a charging power equal to the first charging power;

reducing the charging power output to the electric vehicle from the first charging power to a second charging power, when the first working temperature is greater than or equal to a first temperature threshold and less than a second temperature threshold, and the second working temperature is greater than or equal to a fourth temperature threshold and less than a fifth temperature threshold;

charging the electric vehicle with the charging power lower than or equal to the first charging power, when the first working temperature decreases to be less than or equal to the first temperature threshold;

stopping charging the electric vehicle when the first working temperature is continuously greater than or equal to the first temperature threshold within a predetermined time interval;

determining the reason for stopping charging the electric vehicle this time, when the first working temperature decreases below the first temperature threshold and the second working temperature decreases below the fourth temperature threshold; and controlling the charging of the electric vehicle according to the reason for stopping charging the electric vehicle this time, comprising:

restoring the charging of the electric vehicle, if the reason for stopping charging the electric vehicle this time is that the second working temperature is greater than or equal to the fourth temperature threshold; or if the reason for stopping charging the electric vehicle this time is that the first working temperature is greater than or equal to the first temperature threshold; or if the reason for stopping charging the electric vehicle this time is that the first working temperature is greater than or equal to the first temperature threshold and the second working temperature is greater than or equal to the fourth temperature threshold.

* * * * *